March 26, 1963 E. H. VICKERY 3,082,992
SEALED BALL VALVE
Filed May 12, 1961

INVENTOR:
Edgar Herbert Vickery,
BY
Bair, Freeman & Molinare
ATTORNEYS.

3,082,992
SEALED BALL VALVE
Edgar Herbert Vickery, Oakland, Calif., assignor to Fisher Governor Company, a corporation of Iowa
Filed May 12, 1961, Ser. No. 109,671
6 Claims. (Cl. 251—172)

This invention relates to a ball valve for use in fluid flow lines, and, in particular, to a valve adapted for use under extreme conditions of temperature and pressure.

This application is a continuation-in-part of patent application Serial No. 614,842, filed October 9, 1956, and now abandoned and Serial No. 677,617, filed August 12, 1957 and now abandoned.

Recent technical developments in rocket and missile devices have made imperative the furnishing of control valves for various fluid materials which are operable under extreme conditions. In particular, valves are required for controlling and shutting off the supply of cryogenic fluids such as liquid oxygen, which is handled at a very low temperature and a very high pressure. The valve must be drop tight when closed yet affording full flow when open, and it must be very reliable in its operation.

It is therefore an object of the invention to provide a sealed ball valve which is usable under extreme temperature and pressure conditions, and especially with exotic fluids such as liquid oxygen, liquid nitrogen, and helium gas.

A particular object is to provide a valve which is reliably leak proof under extreme pressure and temperature conditions.

Another particular object is to provide a sealed valve which is readily operable despite large pressure differences on the opposite sides of the valve.

Another object is to provide a sealed ball valve which readily can be manufactured, assembled and disassembled.

These and other objects, advantages and functions of the invention will be apparent on reference to the specification and to the attached drawings, illustrating a preferred embodiment of the invention, in which like parts are identified by like reference symbols in each of the views, and in which.

Figure 1:
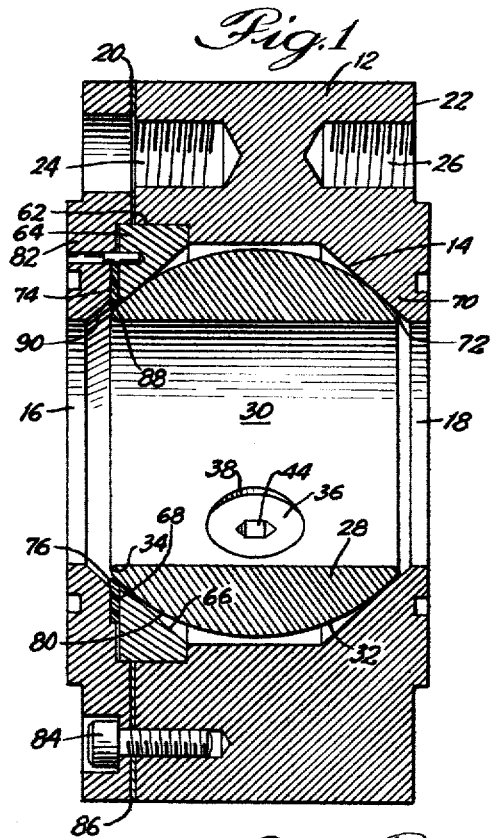
FIGURE 1 is a longitudinal cross-sectional view of the ball valve, taken along the axis of flow, illustrating the valve ball in open position.

The particular problem with which this invention is concerned is to provide a valve which remains reliably drop tight and which also can be turned under extreme conditions. Valves as described in the present invention are drop tight under liquid oxygen at 1.000 lbs. per sq. in. pressure, under liquid nitrogen at 1,200 lbs. per sq. in., and under helium gas at 2,100 lbs. per sq. in. and minus 300° F. These results are accomplished by the particular design of the valve and, very importantly, of the valve seal.

Referring to the drawings, a preferred embodiment of the ball valve is generally indicated at 10, and except for sealing members, it preferably is constructed of metal parts. The valve proper includes a metallic housing 12 having a valve cavity 14 therein establishing communication between axially aligned openings defining a flow passage, in particular, an inlet opening 16 and an outlet opening 18. The body is partly defined by a pair of transverse parallel faces 20 and 22 adjacent the inlet and outlet openings, respectively. The respective faces are provided with threaded recesses 24 and 26 for the reception of appropriate fastening devices (not shown) for securing the valve in a pipeline or comparable conduit.

Figure 2:
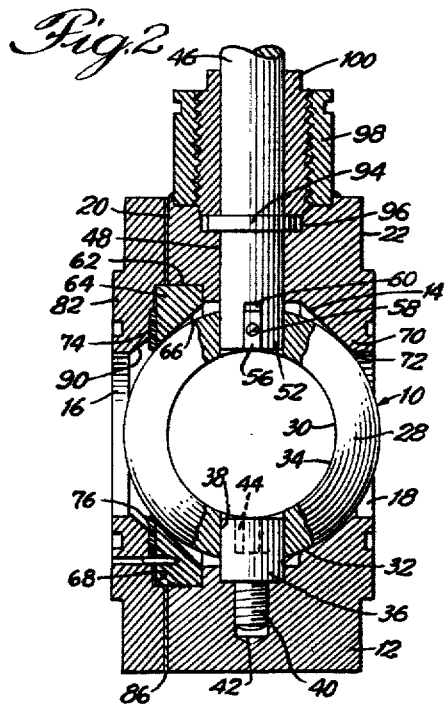
FIGURE 2 is a vertical longitudinal cross-sectional view of the ball valve, with parts in elevation and with the valve ball in closed position, taken along the axis of flow and at an angle with respect to the plane of the section of FIGURE 1.
Figure 3:
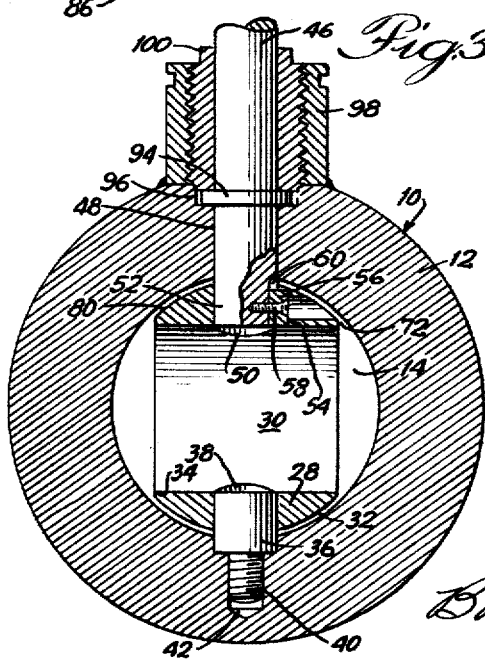
FIGURE 3 is a transverse cross-sectional view of the ball valve with parts in elevation, taken on the axis of rotation of the valve ball and at right angles to the plane of the section of FIGURE 2.

A highly polished metallic valve ball, sphere, or rotor 28 is disposed within the valve cavity 14. The valve ball includes a central cylindrical flow passage or opening 30 therethrough of approximately the same diameter as the inlet and outlet openings 16 and 18, and adapted to register or align therewith in the open position of the valve. The valve is closed by rotating the valve ball 90 degrees, as illustrated in FIGURES 2 and 3. The valve ball has an outer surface 32 which is as nearly as possible spherical, with a slight radius 34 at the intersection of the surface with the flow passage 30, to avoid sharp edges.

The valve ball 28 is designed for rotation about an axis at right angles to the axis of the openings 16 and 18. This rotation is in part effected by a journal plug 36 inserted in the base of the valve ball, which serves as a bearing for the surface of a comparable cylindrical plug opening 38 in the valve ball. The journal plug has an extension 40 that is threaded so that it can be screwed into a threaded recess 42 in the base of the valve housing 12. The length and the diameter of the journal plug 36 are such that this plug can be introduced into its proper position through the inlet opening 16, for example, into the flow passage 30. It can then be dropped in an axial direction through the opening 38 and threaded into the recess 42 to form a firm support and journal mounting for the valve ball 28. To assist in turning and tightening the journal plug, suitable wrench receiving surfaces 44 are provided therein. This construction is described and claimed in my co-pending application Serial No. 109,672, filed May 12, 1961.

A valve stem 46 is secured to the valve ball 28 for rotation therewith, at the top of the valve ball and opposite to the journal plug 36 in axial alignment therewith, coincident with a diameter of the valve ball 28. A corresponding cylindrical vertical opening 48 is provided in the valve housing 12, which provides a journal surface for the valve stem for rotation therein. The valve stem extends into the valve cavity 14 and into a corresponding cylindrical radial bore 50 at the top of the valve ball, so that the inner end 52 of the stem serves as a journal support for the valve ball. The valve ball thus is accurately located for turning and for bearing on the valve stem 46 and the journal plug 36.

The inner end of the valve stem 46 is provided with a longitudinal slot 54 in which a key 56 projecting outwardly therefrom is secured by a fastening 58. The key also seats in a corresponding keyway or groove 60 in the valve ball 28. The interconnection between the valve stem and the valve ball is such that the valve ball can move slightly in the direction of the axis of rotation, while it rotates together with the valve stem. The valve ball is thus free to "float" slightly along the rotational axis, and this slight degree of freedom is important in precluding any binding of the valve ball and providing accurate location of the valve ball relative to the sealing means.

In order to provide the tight seal which is required and overcome prior problems, the surfaces defining the valve cavity 14 are especially contoured. The valve cavity is enlarged, preferably adjacent the inlet opening 16, to provide an annular groove 62 which receives a circular backing ring 64. When the backing ring is seated within the annular recess 62, its inner frusto-conical surface 66 is substantially tangent to the spherical surface 32 of the valve ball except for a slight or minimum running clearance between the surfaces. This is so small as not to be illustrated to scale in the drawing, and in practice should be small enough to provide support for the sealing ring and prevent extrusion between the ball and backing ring. The upstream face 68 of the backing ring lies in a transverse plane perpendicular to the axis of flow through the valve ball, which plane intersects the valve ball 28 between its axis of rotation and the intersection of the flow passage 30 with the ball surface 32 adjacent the inlet opening. The ring face surface is adjacent to but spaced a small distance downstream from the flow passage intersection. The frusto-conical surface 66 continues beyond the point of approximate tangency toward the flow passage intersection, so that the backing ring serves as a firm support for a ring seal, to be described.

A similar construction of a frusto-conical surface is provided by an inwardly extending section 70 adjacent the outlet opening 18. The clearance between the section 70 and the valve ball 28, indicated at 72, is in the preferred embodiment illustrated sufficient for communication of the outlet opening 18 with the downstream face of the ring seal supported by the backing ring 64.

Figure 4:
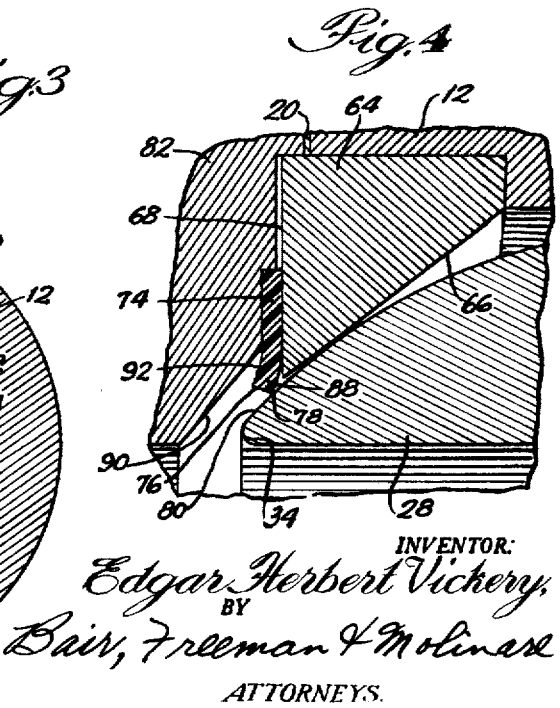
FIGURE 4 is an enlarged fragmentary sectional view like FIGURE 1 illustrating the engagement of the valve seal with the valve ball.

A thin stiff flexible flat ring seal 74 having a surface of deformable material is secured in the housing 12 on the upstream face 68 of the backing ring around and adjacent the inlet opening 16. The construction of this seal is critical to the success of the invention. It is generally planar when standing freely before installation and is annular in plan. It has an inner circular cylindrical periphery 76 defining a central opening, as illustrated in FIGURE 4, where the seal is, however, flexed as it is mounted in use. The inner peripheral surfaces define a downstream edge 78 bordering the seal opening which in use abuts the upstream face 80 of the valve ball in line contact therewith at the edge line, furnishing the desired sealing engagement with the valve ball. The ring seal inner periphery 76 and the edge 78 are highly polished, as is especially the upstream face 80 of the valve ball. Depending upon the material of construction, and in order to avoid crushing the ring seal 74, the edge 78 may be machined or beveled very slightly, providing a narrow band contacting the ball face 80 therearound, the band being on the order of several thousandths of an inch up to, in some cases, about 1/16 of an inch. Such a band may be formed, in any event, by wear occurring at the edge 78. Nevertheless, the seal is required to be substantially in line contact with the ball face at the edge 78.

This and the subsequently described construction produce high unit loading at the contact line of the two smooth surfaces, which prevents fluid from being forced between the seal and the valve ball. At the same time, it overcomes the problems experienced with the prior constructions, when more than substantially line contact was provided between the seal and the valve ball. In the prior constructions, the relatively wide band of contact of the seal caused the seal to fill the imperfections in the ball and also resulted in great frictional forces due to the contact areas. It was very difficult to turn the valve ball, and the seals were distorted and torn. Under low temperature conditions, imperfections on the seal become very hard. The seal shrinks at a different rate than the ball, so that the position of the seal relative to the ball changes, and the imperfections on each no longer match. Such problems are unique to the extreme conditions encountered in the present invention, and were not solved by the prior constructions.

The material of construction is also extremely important, and the common seal materials either do not provide the necessary tight seal, or render it extremely difficult to turn the valve, together with other difficult problems. In overcoming the problems according to the invention, a hard, rigid yet flexible flat ring seal having a surface of deformable material is employed. The seal, or at least the surfaces including the inner downstream edge 78, preferably is constructed of hard and rigid, as distinguished from elastomeric, synthetic thermoplastic resin material, having sufficient flexibility for the construction and sufficient deformability for tightly conforming to the surface of the valve ball 28. Examples of preferred materials fulfilling these requirements are polychlorotrifluoroethylene (Kel-F and Fluorothene), polytetrafluoroethylene (Teflon), and nylon. Such materials are classified according to their mechanical behavior as plastics, not elastomers. The preferred material of construction is the polymer of chlorotrifluoroethylene. This material is especially adapted for liquid oxygen valves. At the temperatures encountered, elastomers such as rubber harden and shatter. Nylon is not used in this application, as it will react violently with the oxygen and is not adapted for the low temperatures. However, it is excellent at higher temperatures and for nitrogen valves under 3,500 lbs. per sq. in. pressure, for example. The polymer of tetrafluoroethylene is subject to crushing and cold flow in liquid oxygen valves and therefore is not recommended; however, in other applications, it may be employed successfully. In the latter case, and in other cases where desirable, the polymer may be reinforced with ceramic fibers, metal, or other materials, while providing the desired outer surface.

The ring seal 74 is secured against the backing ring 64 by an outer annular closure plate 82 secured to the valve body 12 by fastenings 84. One or a plurality of very thin gaskets 86 may be interposed between the closure plate and the valve body, so that the degree of compression of the ring seal 74 can be accurately established. The seal is slightly compressed and held very firmly in position with sufficient tightness to preclude leaking along either face thereof.

The seal 74 when unconfined has a free-standing portion 88 projecting inwardly from the clamped portion thereof. When the seal is installed, it is clamped against the upstream face 80 of the valve ball 28, so that the inner portion 88 of the seal is flexed or bent in the upstream direction by the pressure of the valve ball against the seal downstream edge 78, as illustrated in FIGURE 4. By this construction, the seal edge exerts a bearing pressure on the ball face, which maintains a tight seal under all conditions. This is especially important in connection with the "floating" and accurate location of the valve ball 28, as referred to above, and also in providing for bearing wear at the connections of the valve ball with the valve stem 46 and the journal plug 36. The backing ring 64 adjacent the surface of the valve ball precludes any extrusion of the seal 74 between the ring and the valve ball. It will be noted that the thickness and stiffness of the seal 74 are such that the inner portion 88 thereof is flexed or deformed substantially into a conical shape with the edge 78 only of the seal contacting the valve ball.

As illustrated particularly in FIGURE 1, the closure plate 82, which defines the inlet opening 16, is conically widened in the downstream direction on its inner surface, as indicated at 90, so that the inlet opening communicates with the upstream face 92 of the seal 74 adjacent the seal opening. By this construction, the upstream pressure of fluid in the line acts to increase the pressure of the seal edge 78 on the ball face 80, particularly when the valve is closed. The downstream face of the seal 74 is, in this embodiment, in communication with the downstream opening 18 through the clearance 72, as previously described. The seal is thus very tight, with the sealing pressure augmented by the upstream fluid pressure.

Other parts of the valve 10 which are illustrated include a circumferential collar 94 on the valve stem 46, preventing axial movement of the valve stem. It is seated in a corresponding recess in the valve housing 12, and sealed by an L-shaped packing ring 96 therearound. A neck 98 extends upwardly on the housing 12 and surrounds the valve stem. A tubular packing nut 100 is secured therein in threaded engagement, around the valve stem, and it secures the collar 94 and the packing ring 96. The valve stem 46 may be turned by hand, or when greater turning force is required, by appropriate apparatus furnishing a mechanical advantage.

While a very useful and preferred embodiment of the invention has been described and illustrated, it will be apparent that various changes and modifications may be made in the construction and arrangement of the parts within the spirit and scope of the invention. It is intended that such changes and modifications be included within the scope of the appended claims.

What I claim as new and desire to secure by Letters Patent of the United States is:

1. A sealed ball valve comprising a valve housing having aligned inlet and outlet openings and a stem opening at right angles thereto, a rotatable valve stem extending through said stem opening, a valve ball in said housing and connected to said valve stem for rotation therewith, means forming a flow passage in said valve ball adapted to be rotated into and out of alignment with said inlet and outlet openings for opening and closing the valve, a hard, rigid yet flexible flat annular ring seal having a surface of deformable material secured in such housing around said inlet opening, said ring seal defining a circular opening therein having a diameter greater than said flow passage and adapted for receiving the upstream face of said valve ball in sealing engagement therewith, annular seal backing means in said housing around said inlet opening abutting the downstream face of said ring seal, said seal backing means having an inner surface generally tangent to the outer surface of said valve ball and being closely spaced from said valve ball to prevent extrusion of said ring seal between the backing means and the valve ball, and annular means for flexing said ring seal in the upstream direction adjacent said valve ball, said ring seal being retained between the seal backing means and the flexing means, the surface of the seal backing means engaging the seal extending inwardly toward the flow passage a greater distance than the surface of the flexing means engaging the seal to permit the seal to be flexed so that a downstream edge on said ring seal bordering said seal opening abuts said valve ball face substantially in line contact therewith, whereby said ring seal edge exerts a bearing pressure on said ball face, and whereby the upstream pressure in the flow passage acts against the upstream face of said ring seal to increase the pressure of said ring seal edge on said ball face.

2. A ball valve as defined in claim 1 including means connecting said valve ball for movement about the axis of said valve stem.

3. A ball valve as defined in claim 1 wherein said seal surface is constructed of a synthetic thermoplastic resin.

4. A ball valve as defined in claim 1 wherein said seal surface is constructed of polychlorotrifluoroethylene.

5. A sealed ball valve comprising a valve housing having aligned inlet and outlet openings and a stem opening at right angles thereto, a rotatable valve stem extending through said stem opening, a valve ball in said housing and connected to said valve stem for rotation therewith, means forming a flow passage in said valve ball adapted to be rotated into and out of alignment with said inlet and outlet openings for opening and closing the valve, a thin, hard, rigid yet flexible flat annular ring seal of synthetic thermoplastic resin material secured in said housing around said inlet opening, a seal backing ring in said housing around said inlet opening having an upstream face abutting the downstream face of said seal, an inner surface on said backing ring tangent to said valve ball except for running clearance therebetween, said ring seal including a circular opening having a diameter greater than said flow passage and less than the opening formed by said seal backing ring and adapted for receiving the upstream face of said valve ball in sealing engagement therewith, said ring seal being generally planar before installation, and annular means in said housing upstream of said ring seal for securing said ring seal in position, said annular means having a downstream face abutting the upstream face of said ring seal and having a surface widened radially of said flow passage whereby the downstream edge of said ring seal bordering said seal opening is flexed into substantially line contact with said ball valve when the ring seal is clamped in sealing engagement with the backing ring, with said downstream seal edge exerting a bearing pressure on said ball face, the upstream pressure in the flow passage acting against the exposed upstream face of said ring seal to increase the pressure of said downstream seal edge on said ball face.

6. A ball valve as defined in claim 5 wherein said seal is constructed of polychlorotrifluoroethylene.

References Cited in the file of this patent

UNITED STATES PATENTS

| 2,745,629 | Watson | May 15, 1956 |
| 2,861,773 | Clade | Nov. 25, 1958 |

FOREIGN PATENTS

| 1,922 | Great Britain | Aug. 22, 1859 |
| 78,228 | Sweden | Aug. 29, 1933 |
| 167,585 | Switzerland | May 16, 1934 |

Disclaimer 3,082,992.—*Edgar Herbert Vickery*, Oakland, Calif. SEALED BALL VALVE. Patent dated Mar. 26, 1963. Disclaimer filed Oct. 3, 1967, by the assignee, *Fisher Governor Company*.

Hereby enters this disclaimer to claims 1 to 6 inclusive of said patent.

[*Official Gazette October 31, 1967*]